UNITED STATES PATENT OFFICE.

JOHN REYNOLDS, OF SAN FRANCISCO, CALIFORNIA.

IMPROVED PROCESS FOR REFINING BULLION.

Specification forming part of Letters Patent No. 53,340, dated March 20, 1866.

*To all whom it may concern:*

Be it known that I, JOHN REYNOLDS, of the city and county of San Francisco, State of California, have invented certain new and useful Improvements in Processes of Refining Gold and Silver Bullion in Bars; and I do hereby declare the following specification to be sufficient to enable any person skilled in the art or science to which it most nearly appertains to use the same without further invention or experiment.

The nature of my invention relates to the refining of gold and silver bullion; and the improvement consists in reducing crude bullion in bars, (as it comes from the assayer,) or in any other shape, to a fineness which in gold varies from 992 to 994½ and in silver from 995 to 998 without the necessity of melting and alloying and granulating, both of which operations are rendered unnecessary and useless by my invention.

The process employed for refining bullion previous to my invention may be described as follows, to wit: The bars or bricks of gold and silver bullion, after they have been assayed, are melted and alloyed with copper while in the melted state in the crucible. From thence it is cast into water, which is called "granulation." It is then taken out of the water and placed upon a furnace to dry. After the drying process is completed the granulated bullion is weighed out in charges of one hundred and thirty or one hundred and forty pounds each, and one of these charges is placed in an iron pot with double its weight of sulphuric acid, and there boiled from four to five hours, when the acid, with the silver and baser metals in solution, is bailed into a leaden tank filled with hot water or the mother-liquor from previous operations, in which it is boiled by the agency of hot steam introduced by means of a perforated pipe, leaving the gold in the bottom of the pot. From the tank the acid holding the silver and baser metals in solution is drawn off by means of a siphon into a precipitator, where metallic copper is introduced, which precipitates the silver held in solution in a metallic state, after which both gold and silver are subjected to what are known as the "sweetening," "pressing," and "drying" processes. It is found, however, to be necessary in order to obtain fine gold or silver to repeat this operation, as by once passing through this process the gold is found to be only about from 950 to 970 fine, and the process has to be again repeated in order to bring the fineness up to 990 to 995, which is the usual standard of fineness in private refineries and in mints.

The improved process as invented and employed by myself may be stated as follows, to wit: I take a charge of crude bullion of any convenient weight (a pot which in working by the old process would work a charge of from one hundred and thirty to one hundred and forty pounds will, in working by my improved process, work from three hundred to four hundred pounds) and place it on the bottom of an iron pot, adding a sufficient amount of sulphuric acid to cover the said charge of bullion, and boil the whole mass together for about one hour, after which I add more sulphuric acid from time to time, as may be necessary, until the silver and baser metals are all dissolved and held in solution in the acid, the whole amount of acid required being generally about equal in weight to the charge of crude bullion in the pot. The time necessary for boiling will vary according to the heat applied, the usual time being from four to five hours. The acid holding in solution the silver and baser metals is then drawn off or bailed into a tank lined with lead, leaving the gold settled in the bottom of the pot, where it is washed with hot sulphuric acid, in order to remove as much of the sulphate of silver remaining as possible. I then place the gold in a filter corresponding in size to the amount of gold to be treated, where hot water is poured over it until it is perfectly sweetened—that is, until no trace of sulphate of silver or acid can be found in the water as it runs away from the gold. It is then pressed and dried, after which it is melted and molded into ingots or bars, whose fineness will be found to be from 992 to 994½.

The tank into which the solution of silver and baser metals is drawn off is supplied with a perforated lead pipe, through which steam is introduced for heating purposes, as in the method now in common use. It is then drawn off into a precipitator, in which heat is kept up by means of steam passing through a closed lead pipe passing through the said precipitator. Copper is now introduced as in the old process, which precipitates the silver in metallic state of a fineness varying from 995 to 998. The copper remaining in solution is then drawn off into the copper-house, where it is converted into crystals by the methods now well known and in common use in refineries.

Some of the advantages to be derived from my improved process of refining gold and silver bullion may be enumerated as follows: First, the melting and alloying with copper and granulating before treating with sulphuric acid are rendered entirely unnecessary; second, by my process gold from 992 to 994½ fine is produced by the first treatment, whereas by the old process with one treatment gold of the fineness of only 950 to 970 is produced, rendering it necessary oftentimes to go through the process two and even three times before the gold can be brought up to a fineness of 992 or 994, thus incurring more than double the expense required by my improved process of refining; third, close returns can be made by my process every day, whereas two or three days or more are required in order to make close returns by the old process.

Having thus described my process for refining gold and silver bullion so as to enable any person skilled in the art or science to which it most nearly appertains to use the same without further invention or experiment, I will now proceed to state what I claim and desire to secure by Letters Patent:

The improved method of refining gold and silver bullion in bars, bricks, or any other shape, whereby the necessity of melting and alloying with copper and granulating before refining is obviated, substantially as described, and for the purposes set forth.

In witness whereof I have hereunto set my hand and seal this 17th day of June, A. D. 1865.

JOHN REYNOLDS. [L. S.]

Witnesses:
C. W. M. SMITH,
W. O. ANDREWS.